L. G. HANDY.
WHEEL.
APPLICATION FILED JUNE 4, 1910.
1,013,994.
Patented Jan. 9, 1912.
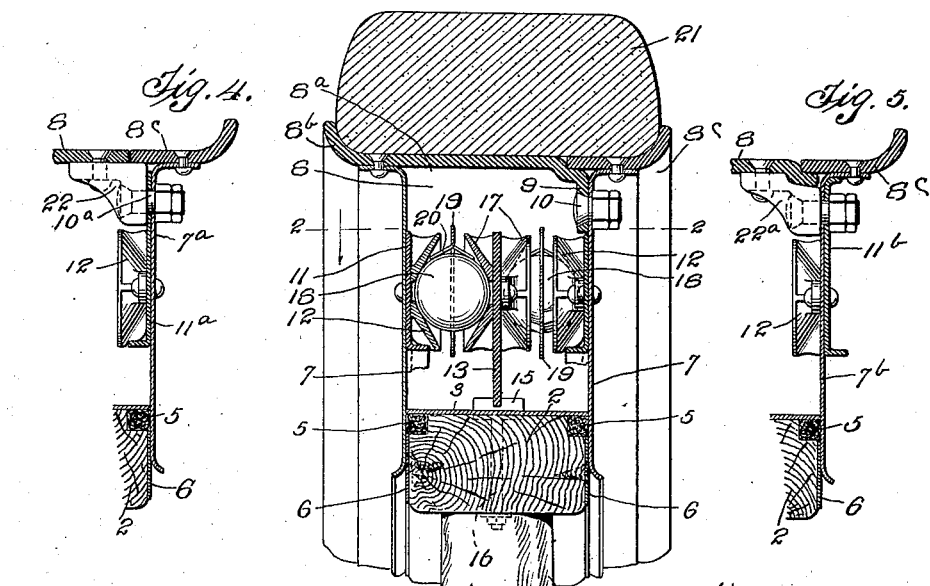
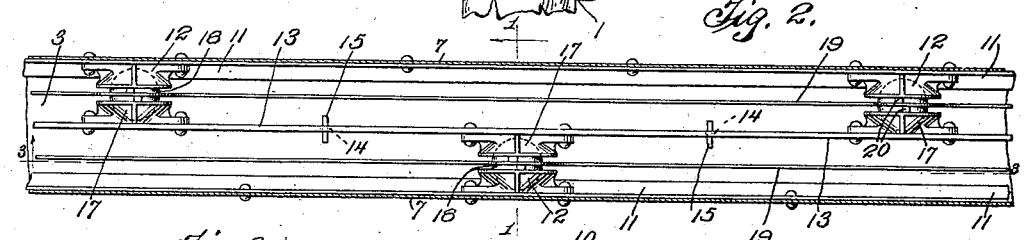
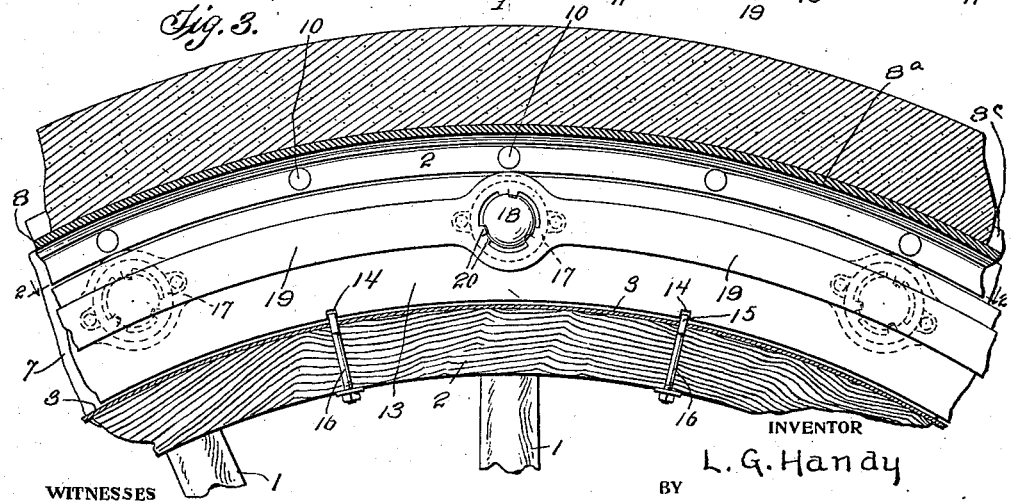
WITNESSES
INVENTOR
L. G. Handy
BY
F. H. Gibbs
ATTORNEY

UNITED STATES PATENT OFFICE.

LEVIN GESSFORD HANDY, OF RUTHERFORD, NEW JERSEY, ASSIGNOR TO WILLIAM C. DICKERMAN, OF NEW YORK, N. Y.

WHEEL.

1,013,994.  Specification of Letters Patent.  Patented Jan. 9, 1912.

Application filed June 4, 1910. Serial No. 565,063.

*To all whom it may concern:*

Be it known that I, LEVIN GESSFORD HANDY, residing at Rutherford, New Jersey, and being a citizen of the United States, have invented certain new and useful Improvements in Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a transverse, vertical section taken on a plane indicated by line 1—1 of Fig. 2. Fig. 2 is a longitudinal, circumferential section taken approximately on a plane indicated by line 2—2 of Fig. 3, the parts being seen in extension. Fig. 3 is a vertical, circumferential section taken approximately on the plane indicated by line 3—3 of Fig. 2. Figs. 4 and 5 are fragmental detail cross sections of slightly modified embodiments.

It has been proposed to substitute the resiliency of a metal spring for the elasticity of a pneumatic tire, but difficulty has been experienced in producing a practicable structure or one in which the weight of the parts is not excessive, and it is the primary object of the present invention to produce a wheel structure whose peripheral formation affords both resiliency and elasticity equal to that of a pneumatic tire at a less initial expense as well as at less expense of maintenance than a pneumatic tire, the improved structure involving but the minimum number of relatively light, cheap and simple parts susceptible of quick and easy assemblage and dismantling.

A further object of the invention is the combining of frictional and spring connections between a rim and a wheel body disposed outside the wheel body and confined by the rim.

A still further object is the confining of laterally acting spring pressure elements between a wheel body and its rim, and the provision of reinforcing means for preventing lateral distortion of the confining means.

Referring by numerals to the drawings, in which only a fragment of a wheel has been illustrated, 1 indicates the spokes, 2 the felly, and 3 the fixed rim of a wheel body which with the hub, not shown, may be of any ordinary construction, these parts forming the wheel body. The outer circumferential corners of felly 2 are formed with annular rabbets 5—5, in which are disposed packing rings which may, if desired, be provided with a suitable lubricant. Fixed to each edge or side of the felly 2 is an annulus or flat ring 6 adapted to serve as a wear plate for the respective shiftable guide plates 7—7 of the detachable rim 8. Each of the guide plates 7 is formed of an annular channel having a relatively small flange at its inner edge and having its outer flange fixed to detachable rim 8. Plates 7 are spaced apart a distance for allowing felly 2 with its plates 6 to snugly fit therebetween and to allow relative radial movement of the parts.

The detachable rim 8 may be of various forms, but preferably consists of flat, annular band $8^a$ having a tire retaining flange $8^b$ at one edge, and a detachably connected ring $8^c$ at the other edge, the ring $8^c$ having a complemental tire retaining flange. The plate 7 at the side of the wheel at which ring $8^c$ appears is fixed to said ring, and the ring $8^c$ may be fixed to the main portion of the detachable rim in various ways, as by an inwardly turned annular flange 9 extending from the band $8^a$ and bolted at various spaced points, as at 10—10, to the plate 7. Each bolt 10 has its head engaging flange 9 and its outer end extending through the respective plate 7, and engaged by a retaining nut adapted when desired to be removed for facilitating detachment of the ring $8^c$, plate 7, and connected parts, for enabling ready access to the interior space between the fixed and detachable rims. Obviously the nut for each bolt 10 may be secured by a suitable lock nut or other retaining device.

Intermediate the edges of each plate 7, the same is stiffened by an annular plate 11 fixed to the inner face of the respective plate 7 and disposed concentric thereto, each plate 11 being suitably flanged for stiffening and strengthening purposes and for resisting expanding stresses. Opening inwardly from the inner face of and fixed to each plate 11 and also to the respective plate 7 are cups 12—12 spaced apart circumferentially. A flat or plate spring 13, constructed in the form of an annulus, surrounds the wheel body and is spaced between the fixed and detachable rims and has its inner edge notched at intervals as at 14. Extending into each notch 14 is a flat head 15 of a bolt 16 extending radially through the fixed rim and felly and connected thereto by a suitable nut engaging the inner end of the bolt. The annulus comprising the plate spring 13 has its shortest radius slightly longer than the maximum radius of the wheel body, so that the inner edge of said annulus, when the parts are not under stress, is spaced from the fixed rim 2 and is capable of radial movement relative thereto, the notches 14 being of sufficient depth to accommodate such movement and the outer edge of the element 13 being spaced from the inner face of rim 8. When the parts are under stress the spring plate 13 is flexed in alternate opposite directions from the median line of the wheel, because of the co-action of the balls 18 and 20 with their respective retaining cups, thereby causing the annular plate spring 13 to assume a lesser diameter than when not under stress. Notches 14 however allow of little if any circumferential or tangential play of the spring 13 relative to the wheel body, and hold the spring annulus in engagement with the wheel body while allowing free lateral movement of the annulus on the wheel body. Fixed to the flat faces or sides of plate spring 13 are outwardly opening cups 17—17, disposed immediately opposite the corresponding cups 12 and forming pairs therewith and, as the cups 12 on one plate 11 are staggered about the wheel relative to the cups 12 on the other plate 11, the cups 17 are correspondingly staggered, one at one side of plate spring 13 and the next at the opposite side thereof. A ball 18 is disposed between the cups of each pair of cups comprised of a cup 12 and a cup 17, the cups of each pair being spaced apart a distance considerably less than the diameter of the ball and engaging the ball at opposite sides for allowing lateral shifting of the ball only under spring tension, movement of the ball out the inclined sides of the cups resulting in spreading the cups apart. For insuring maintenance of the relative positioning and spacing of the balls in operation and also to facilitate the assemblage and dismantling of the parts, the balls 18 are engaged by annular ball retainers 19—19, each preferably consisting of an annulus perforated for receiving each of the balls past which it extends, and having laterally disposed retaining fingers 20—20 at the point of each of said perforations for engaging the respective ball and carrying same. A tire 21 may be provided for rim 8 for muffling purposes.

In operation, the vertical thrust occasioned by the load carried by the wheel body depresses the wheel body, causing the detachable rim to assume a position eccentric to the fixed rim, and such relative position of the parts is maintained during operation, the degree of eccentric positioning of the detachable rim varying with variations in the load and disappearing altogether with the removal of the load, that is, the detachable rim becomes concentric with the fixed rim when the weight on the wheel body or of the wheel body itself is insufficient for producing lateral movement of the spring annulus and subjecting the spring to torsion. The stress transmitted from the wheel body under normal conditions, depresses the spring annulus, forcing downwardly the lower portions thereof, and pulling downwardly the upper portions, thus causing all of the cups 17 to be moved downwardly, all said cups being maintained substantially in a circular line by the spring annulus. This downward movement of the cups 17 causes the upper portion of each to engage the corresponding portion of its respective ball and forces the same downwardly against the lower portion of the respective cup of rim 8, this action tending to force the cups apart, and thus bend or bow the spring annulus 13 first in one direction and then in the other, owing to the staggered relation of the balls, to a sinuous form against the spring pressure of the annulus, which spring pressure tends constantly to restore the annulus to its normal straight condition. Different balls at different parts of the wheel exert pressure at relatively different points in the width of the plate spring annulus so as to subject the spring to distorting torsion, appearing most appreciably at the top and bottom, and varying proportionately between these two points according to the varying relative positions existing between the intermediate balls and cups. As the wheel rotates, the travel of the several cups 12 and 17 causes the balls 18 to travel about the cups in orbits varying according to the load sustained, and remaining substantially constant under a given load except for such variations as may occur in taking up the shocks from the rim due to unevenness and irregularities on the road. It is of course obvious that such variations will produce varying radial movements of the balls, with resultant varying lateral bowing of the spring annulus, and such annulus in its effort to straighten its resutlant sinuous form will offer resiliency and elasticity for absorbing such shocks, excessive vibration being obviated by the friction between the cups and balls. When the wheel body is the driven element and power is transmitted therefrom to the detachable rim, such power is transmitted through the spring annulus and thence laterally through the friction means to the rim. It is to be observed that the space between the outer edge of the spring annulus and the inner surface of the detachable rim is sufficient for allowing ample vibratory movement of the detachable rim for practical purposes, and at the same time said space is not sufficient for allowing the cups at any time to pass beyond the balls and release the same. Plate spring 13 may, of course, vary in size and thickness in different wheels according to the service required, and is preferably made of spring steel or other material adapted to the particular service, and the spring is disposed in the circumferential median line of the rim and felly for affording an equal balance in the disposition of the other stress transmitting elements.

In Fig. 4, a slightly modified form of the invention is illustrated in which the rim 8 has its detachable rim 8ᶜ connected by corner blocks or brackets 22 fixed to the main body of the rim and to the plate 7ᵃ, corresponding to plate 7, and fixed to the ring 8ᶜ. In this structure the flange 9 is omitted, and the stiffening plate 11ᵃ may have greater width than plate 11 and be penetrated by the bolts 10ᵃ which connect the blocks 22 to plate 7ᵃ. It is to be observed that the tread portion of the ring 8ᶜ in the structure seen in Fig. 1, is disposed flush with the main band of the rim, being accommodated by a suitable offset in said band, but in the structure seen in Fig. 4 the offset is obviated by allowing the edges of the parts to meet, the means of attachment of the ring in this latter embodiment allowing such meeting.

In Fig. 5 is illustrated a further embodiment in which the inner edge of the main band of the rim is offset and overlapped by the inner edge of the tread portion of the ring, after the manner seen in Fig. 1, the ring and band being connected by blocks or corner brackets 22ᵃ fixed to said band and bolted to plate 7ᵇ which is fixed to the ring and corresponds to plate 7. A circumferential stiffening plate 11ᵇ, corresponding to plate 11, is provided, and disposed on the outside of plate 7ᵇ, and preferably flanged at both its inner and outer edges, the plate extending outwardly to and engaging the outer flange of plate 7ᵇ.

While I have illustrated and specifically described the plate spring or spring annulus as connected to the wheel body, it is obvious that the same may be otherwise connected, and it is of course desirable that such mechanical equivalent shall be considered in interpreting the appended claims.

What I claim is:

1. In a wheel, a wheel body, a rim surrounding the same, guide plates at each side of the wheel body having their outer portions fixed to the rim, a plate spring disposed edgewise to the wheel body and inclosed between the guide plates, and frictional means of engagement between the guide plates and said spring.

2. In a wheel, a wheel body, a rim surrounding the same, guide plates at each side of the wheel body having their outer portions fixed to the rim, a plate spring annulus disposed edgewise of the wheel body and surrounding the same and inclosed between the guide plates, and frictional means of engagement between the guide plates and said spring annulus.

3. In a wheel, a wheel body, a rim surrounding the same, guide plates at each side of the wheel body having their outer portions fixed to the rim, a plate spring annulus disposed edgewise to the wheel body and having free lateral movement upon the wheel body and inclosed by the guide plates, and frictional means of engagement between the guide plates and said spring annulus.

4. In a wheel, a wheel body, a rim therefor, a spring annulus disposed edgewise to and surrounding the wheel body, and means of engagement between the wheel body and the spring annulus and means between the spring annulus and rim for transmitting power from the wheel body to the rim disposed and adapted for constantly subjecting portions of the spring annulus to torsion directly from the regular action of sustaining the load, said last mentioned means being on each side of said spring annulus.

5. In a wheel, a wheel body, a plate spring annulus disposed edgewise to the periphery of the wheel body and freely laterally movable relative to the wheel body and positioned substantially along the circumferential median line of the wheel body, means of engagement between the spring annulus and wheel body, a rim for the wheel body, and means of engagement between opposite sides of the spring annulus and the rim.

6. In a wheel, a wheel body, a rim therefor, a plate spring annulus disposed edgewise to and surrounding the wheel body, cups fixed to each of the flat faces of the spring annulus, means of engagement between the spring annulus and the wheel body, opposing cups connected with the rim and forming pairs with the cups of the annulus, and anti-friction means interposed between and engaging the cups of each pair.

7. In a wheel, a wheel body, a rim therefor, a plate spring engaging one of said elements and means of frictional engagement between the spring and the other element, said means comprising outwardly opening cups carried by and fixed to the spring at opposite sides thereof, inwardly opening cups carried by the said other element and disposed facing the first mentioned cups at opposite sides of the spring and forming pairs with the spring-carried cups, and a ball between the cups of each pair, the pairs of cups being arranged in staggered relation about the wheel.

8. In a wheel, a wheel body, a rim therefor, a plate spring disposed between the rim and wheel body and having free lateral movement upon the wheel body and arranged edgewise with respect thereto beyond and engaging the wheel body, cups spaced apart and alternately extending from the opposite faces of the spring, corresponding cups opposite the first mentioned cups and forming pairs therewith, a ball between the cups of each pair and means connected with the rim for supporting said second mentioned cups.

9. In a wheel, a wheel body, an annular plate spring disposed edgewise thereto and having free lateral movement upon the wheel body and engaging the periphery thereof, outwardly opening cups fixed to the spring and disposed alternately on opposite faces thereof in staggered relation about the spring, a rim surrounding the spring, cups carried by said rim corresponding to the first mentioned cups and facing inwardly and forming pairs with the first mentioned cups and a ball disposed between the cups of each pair.

10. In a wheel, a wheel body, a plate spring engaging the periphery thereof and extending edgewise therefrom and having free lateral movement upon the wheel body, a rim surrounding said wheel body, and frictional means disposed at each side of the spring and engaging the rim and the spring.

11. In a wheel, a wheel body, a circumferentially disposed plate spring held in engagement with the periphery of the wheel body and outstanding therefrom and having free lateral movement upon the wheel body, a rim surrounding said wheel body outside the spring, guide plates fixed to the rim and extending past the spring at either side thereof and inclosing the peripheral portions of the wheel body, and balanced friction means at opposite sides of the spring affording means of engagement between the spring and the guide plates.

12. In a wheel, a wheel body having a felly, a rim surrounding and spaced from the felly, circumferential guide plates fixed to the rim and extending inwardly therefrom into sliding engagement with the opposite sides of the felly, a circumferentially disposed spring plate connected to the wheel body and extending edgewise therebeyond between the guide plates and having free lateral movement upon the wheel body, cups fixed to the guide plates and opening toward the spring, cups fixed to the spring and opening toward the guide plates and forming pairs with the cups of the guide plates and a ball between the cups of each pair.

13. In a wheel, a wheel body, a circumferential plate spring disposed edgewise to and beyond the periphery of said wheel body, cups extending laterally from said spring, a rim surrounding the wheel body and spring, complemental cups carried from the rim and disposed for forming pairs with the cups of the spring, a ball between the cups of each pair, and a ball retaining ring engaging the balls at one side of the spring for retaining the balls in the same relative position with respect to each other.

14. In a wheel, a wheel body, a circumferentially disposed plate spring engaging the periphery of the wheel body, a rim surrounding the wheel body and inclosing said spring, guide plates extending from the rim past the opposite side portions of the wheel body, means detachably connecting one of said guide plates to the rim, cups extending from the spring toward the side plates, cups extending from the guide plates toward the cups of the spring and forming pairs therewith, a ball between the cups of each pair, and a ball retainer engaging all the balls at one side of the spring and maintaining a fixed relation of said balls with respect to each other.

15. In a wheel, a wheel body, a plate spring disposed edgewise to the periphery of the wheel body and freely laterally movable relative to the wheel body, means of engagement between the spring and wheel body, a rim for the wheel body, and means of engagement between the rim and opposite sides of the spring.

16. A device of the character described including a wheel body, a rim surrounding said wheel body, an annular resilient spring, means for attaching said spring to said wheel body, side plates attached to said rim, and means between each of said side plates and said resilient spring member constructed to transmit forces on opposite sides of said annular resilient spring member to flex said annular spring member in opposite directions when loads are being sustained by the wheel body.

17. A device of the character described including a wheel body, a rim encompassing said wheel body, an annular spring member, means for attaching said annular spring member to said wheel body, side plates attached to said rim and arranged on each side of said annular spring member, friction means intermediate each side plate and said annular spring member, said means being arranged in alternation between each of said attaching means, the construction and arrangement of parts being such that said annular spring is alternately flexed in opposite directions between each of said attaching means when said wheel body is under load.

18. A device of the character described including a wheel body, a rim surrounding said wheel body, side plates attached to said rim, an annular steel spring intermediate said side plates, means for attaching said annular spring to said wheel body in such manner as to permit lateral movement of said spring upon said wheel body, and means intermediate said annular spring and each of said side plates, the construction and arrangement of parts causing said annular spring to be flexed in alternate opposite directions when said wheel body is rotated under resistance applied to said rim.

19. In a wheel, a wheel body, a plate spring in engagement therewith along the circumferential median line thereof and outstanding edgewise therefrom, a rim surrounding said spring and wheel body, and means alternately arranged between said rim and spring for simultaneously distoring the spring in opposite directions.

20. In a wheel, a wheel body, a spring plate in engagement with the wheel body along the circumferential median line thereof and outstanding edgewise therefrom, a rim surrounding said spring and wheel body, and laterally disposed friction means alternately arranged on opposite sides of said spring between the spring and rim for distorting said spring in opposite directions.

21. In a wheel, a wheel body, a rim therefor movable relative thereto, a circumferentially disposed plate spring floating between the wheel body and the rim and bodily movable laterally on the wheel body and disposed edgewise to the periphery of the wheel body, and means of engagement between the rim and the spring to subject the spring to torsion in proportion to the movement of the rim relative to the wheel body.

22. A device of the character described including a wheel body, a rim surrounding said wheel body, an annular spring member arranged edgewise with reference to said wheel body, and means disposed between said rim and annular spring to simultaneously flex said spring in opposite directions so as to contract the spring upon said wheel body when the wheel body is under load.

23. A device of the character described including a wheel body, a rim surrounding said wheel body, an annular spring member arranged edgewise with reference to said wheel body and bodily movable laterally thereupon, means carried by said wheel body in engagement with said annular spring, and means disposed between said rim and annular spring to simultaneously flex said spring in opposite directions so as to contract the spring upon said wheel body when the wheel body is under load.

In witness whereof I have hereunto set my hand in the presence of two witnesses.

LEVIN GESSFORD HANDY.

Witnesses:
    Edgar M. Kitchin,
    Frank V. Cooper.

---

Copies of this patent may be obtained for five cents each, by addressing the "Commissioner of Patents, Washington, D. C."